United States Patent [19]

Heavener

[11] 4,427,055
[45] Jan. 24, 1984

[54] HEATING AND COOLING SYSTEM USING GROUND WATER

[75] Inventor: Michael G. Heavener, Gaithersburg, Md.

[73] Assignee: Memtel Corporation, Gaithersburg, Md.

[21] Appl. No.: 195,089

[22] Filed: Oct. 8, 1980

[51] Int. Cl.³ .................. F25B 13/00; F25B 29/00; F25D 17/00
[52] U.S. Cl. .................................. 165/29; 165/45; 62/260; 62/160; 62/181; 236/1 E
[58] Field of Search ............... 62/260, 160, 238.6, 62/181, 183, 506; 165/45, 26, 29; 237/2 B; 236/1 E, 1 EA

[56] References Cited

U.S. PATENT DOCUMENTS

| | | | |
|---|---|---|---|
| 2,202,946 | 6/1940 | Carrier | 236/1 EA |
| 2,299,531 | 10/1942 | Crawford | 62/260 |
| 3,993,120 | 11/1976 | Iberg et al. | 165/26 |
| 4,012,920 | 3/1977 | Kirschbaun | 62/238.7 |
| 4,270,362 | 6/1981 | Lancia et al. | 236/1 E |
| 4,327,560 | 5/1982 | Leon et al. | 165/45 |

Primary Examiner—Edward G. Favors
Assistant Examiner—Harry Tanner
Attorney, Agent, or Firm—Haight & Associates

[57] ABSTRACT

A forced air heating and cooling system employs a water source heat pump as the primary heating source and as a back-up or supplementary source of cooling. Supplementary heating is supplied by an electrical heater such as resistance heater, while primary cooling is provided by a water coil heat exchanger. Separate thermostats control the heat pump on the one hand, and the resistance heater and water coil heat exchanger on the other hand; the two thermostats can be combined in a simple unit. The thermostats automatically control two valves which control system water flow. For cooling, a first valve opens to permit water flow in series through first the water coil and then the heat pump. For heating, only the second valve is opened to bypass the water coil and deliver water directly to the heat pump. The water is ground water derived from a well, spring or lake. The thermostats automatically switch on the heat pump, heater and/or heat exchanger to effect the necessary heating or cooling.

6 Claims, 4 Drawing Figures

FIGURE 4

| CONTROL CONDITION #46 | THERMOSTAT #41 | THERMOSTAT #42 | FAN SWITCH #50 | VALVE #51 | COMPRES'R SWITCH #52 | FAN SWITCH #53 | COOL VALVE #47 | HEAT VALVE #48 | ELECTRIC DUCT HEAT #12 | RELAY #44 | RELAY #43 |
|---|---|---|---|---|---|---|---|---|---|---|---|
| OFF | OFF | OFF | AUTO | COOL | OFF | OFF | OFF | OFF | OFF | OFF | OFF |
| OFF | OFF | OFF | ON | COOL | OFF | ON | OFF | OFF | OFF | OFF | OFF |
| HEAT | OFF | OFF | AUTO | HEAT | OFF | OFF | OFF | OFF | OFF | ON | OFF |
| HEAT | ON | OFF | AUTO | HEAT | ON | ON | OFF | ON | OFF | ON | OFF |
| HEAT | ON | ON | AUTO | HEAT | ON | ON | OFF | ON | ON | ON | ON |
| HEAT | OFF | ON | AUTO | HEAT | ON | ON | OFF | ON | ON | ON | ON |
| COOL | OFF | OFF | AUTO | COOL | OFF | OFF | OFF | OFF | OFF | OFF | OFF |
| COOL | OFF | ON | AUTO | COOL | OFF | ON | ON | OFF | OFF | OFF | ON |
| COOL | ON | ON | AUTO | COOL | ON | ON | ON | OFF | OFF | OFF | ON |
| COOL | ON | OFF | AUTO | COOL | ON | ON | ON | OFF | OFF | OFF | ON |

HEATING AND COOLING SYSTEM USING GROUND WATER

BACKGROUND OF THE INVENTION

This invention relates to an improved heating and cooling system which reduces the amount of electric energy used and therefore lowers operating costs.

The majority of new electric heating and cooling systems being installed today are air source heat pumps. The air source unit, in the heating mode, suffers from a number of problems whereby a significant amount of costly supplementary heat is required. These problems result from trying to extract heat from very cold outside air that often ranges from 40° F. to −20° F. By using water in the temperature range of 60° F. to 40° F., heated by the sun and stored in the earth, most if not all of the problems encountered by the air source system can be overcome. Water source heat pumps, wherein water temperatures are above 60° F., have been used successfully in Southern States, particularly in Florida. Partly because of the previous low cost of energy and partly because of technological problems in operating water source heat pumps using water below 60° F., there has been little or no use of ground water systems in the colder climates.

Recently several manufacturers have developed water source heat pumps for closed loop office building applications that will operate with water at such lower temperatures; however, there are implementation problems involved in adapting one of these units for use in a ground water application in small buildings. In northern climates, the winter heating load (i.e. BTU heat loss) capacity is two to four times greater than the average summer air conditioning load. The standard approach is to size either an air or water source heat pump based on the air conditioning load. This results in not enough heating capacity in the winter, which capacity must be made up by expensive supplemental electric or oil heat. The other choice is to size the system based on the larger heating load, but this results in poor humidity control because of short air conditioning cycles. Even with the present invention and its solution to the previously mentioned problems, it is not cost-effective to install extra heating or cooling capacity to handle the few days a year when extremely hot or cool weather is encountered. What is required in conjunction with a system that can be independently sized for heating and cooling is a low cost supplemental or backup heating and cooling means for extreme weather situations. It is one object of the present invention to provide such means.

Another object of this invention is to provide a very economical air conditioning system. In view of the fact that many utilities have a peak load in the summer due to peaks in air conditioning use, much higher prices are charged for electricity in the summer thereby making air conditioning costs about equal to heating costs even though far less energy is actually consumed during air conditioning.

SUMMARY OF THE INVENTION

In accordance with one aspect of the present invention, a forced air system utilizes a heat pump as a primary heating system and a resistance duct heater as a backup heater. The primary cooling system is a chilled water coil/heat exchanger in the return air supply with the heat pump serving as a cooling backup. Two thermostats, each with heating and cooling contacts, control which motors, valves, relays, etc. are activated to properly operate the system. A heat-off-cool switch on one of the thermostats changes the system from heating to cooling and back without any manual intervention.

The water coil/heat exchanger used for cooling is connected to the return side of a heat pump air-to-freon heat exchanger. After the return air passes over the two heat exchangers, it is drawn through an air handler inside the heat pump. The air then exits the blower and the heat pump and passes through a resistance heating unit before being distributed through duct work to supply registers/grills throughout the conditioned environment. Air filters are placed ahead of the water coil air supply to collect dust and dirt. The heat exchangers, blower and filters are in series in the air flow to permit them to be used simultaneously in various combinations. Water flow controling solenoid valves apply water to the heat pump and water coil based on signals from the control panel and thermostats. In the heating mode water is applied only to the heat pump while the passageway in the water coil is simultaneously blocked. For cooling, the water flows first through the water coil and then passes through the heat pump.

BRIEF DESCRIPTION OF THE DRAWINGS AND TABLES

The above and other objects, features and advantages of the present invention will become apparent upon consideration of the following detailed description of one specific embodiment thereof, especially when taken in conjunction with the accompanying drawings in which like or corresponding reference characters refer to similar parts in the various Figures, and wherein:

FIG. 4 is a table showing the states of each major electrical function which is operated by the controls shown in FIG. 3.

DESCRIPTION OF THE PREFERRED EMBODIMENT

Figure 1:
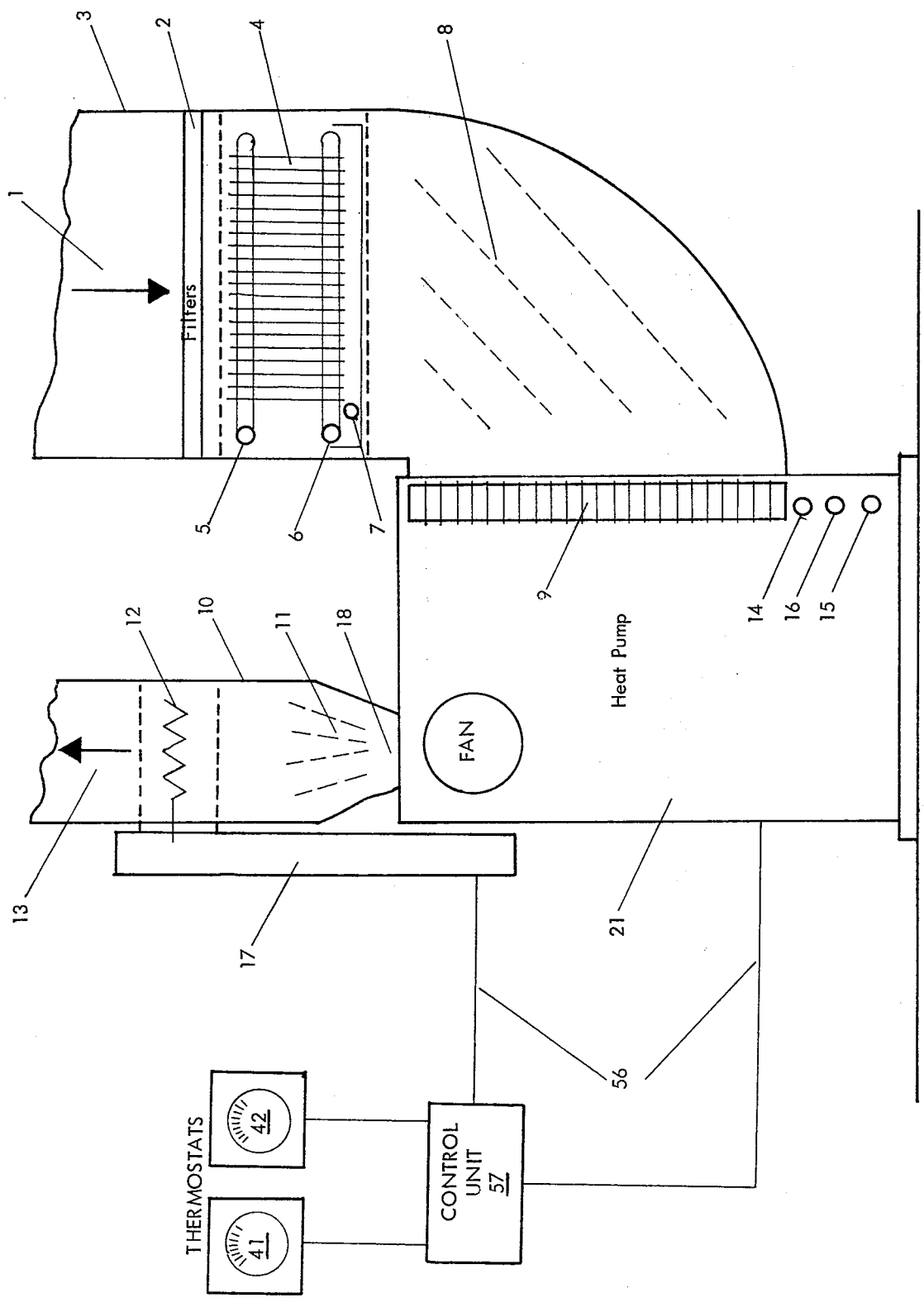
FIG. 1 is a diagrammatic illustration of the major system elements and their interconnection.

The mechanical arrangement of the major system components is shown in FIG. 1. Air flow intake 1 from either one or more central returns and/or individual room returns enters a ground water energy system duct 3 which is preferably made of sheet metal. Removable filters 2, which absorb dust and dirt, clean the air before it enters the heat exchangers described below. A copper and aluminum water coil/heat exchanger 4 sized for the summer air conditioning load is mounted inside the ductwork. In order to properly cool and dehumidify the air, and in view of the fact that the temperature of the entering water is often in the 50° F.–60° F. range, a number of unique design features are used. The water coil is oversized by using a unit that is rated at twice the capacity needed. This is accomplished by using an "A"-shaped coil and extra large return ductwork. The large coil permits more BTU's of cooling with less water (which is often in short supply) and lower air velocity, thereby permitting water droplets to form for dehumidification. Dehumidification occurs despite the fact that the water temperature is often warmer than normally used in water coils in other cooling applications. Water inlet 6 and outlet 5 and condensate drain 7 are also shown in FIG. 1 but are described in detail in relation to FIG. 2. Internal baffles 8 of a conventional nature are either welded or screwed inside the return duct to insure that the return air is evenly distributed across the heat pump freon-to-air heat exchanger 9. The heat pump water inlet 16, outlet 15 and condensate 14 fittings are also shown in FIG. 1 but described in detail below in relation to FIG. 2. The blower or air handler is internal to the heat pump 21. The air egressing at 18 from heat pump 21 is directed to the supply ductwork 10. Internal baffles 11 in ductwork 10 spread the supply air evenly over the electric heater elements to prevent hotspots and element burnout; at least two feet of space should exist between the top of the heat pump 21 and the electric heating elements 12 to permit the baffles to distribute the air evenly over the heating elements. The duct heater 12 includes a control and contactor cabinet 17 which is supported by the downstream duct 10. The conditioned air finally exits duct 13 for distribution to the conditioned space.

Figure 2:
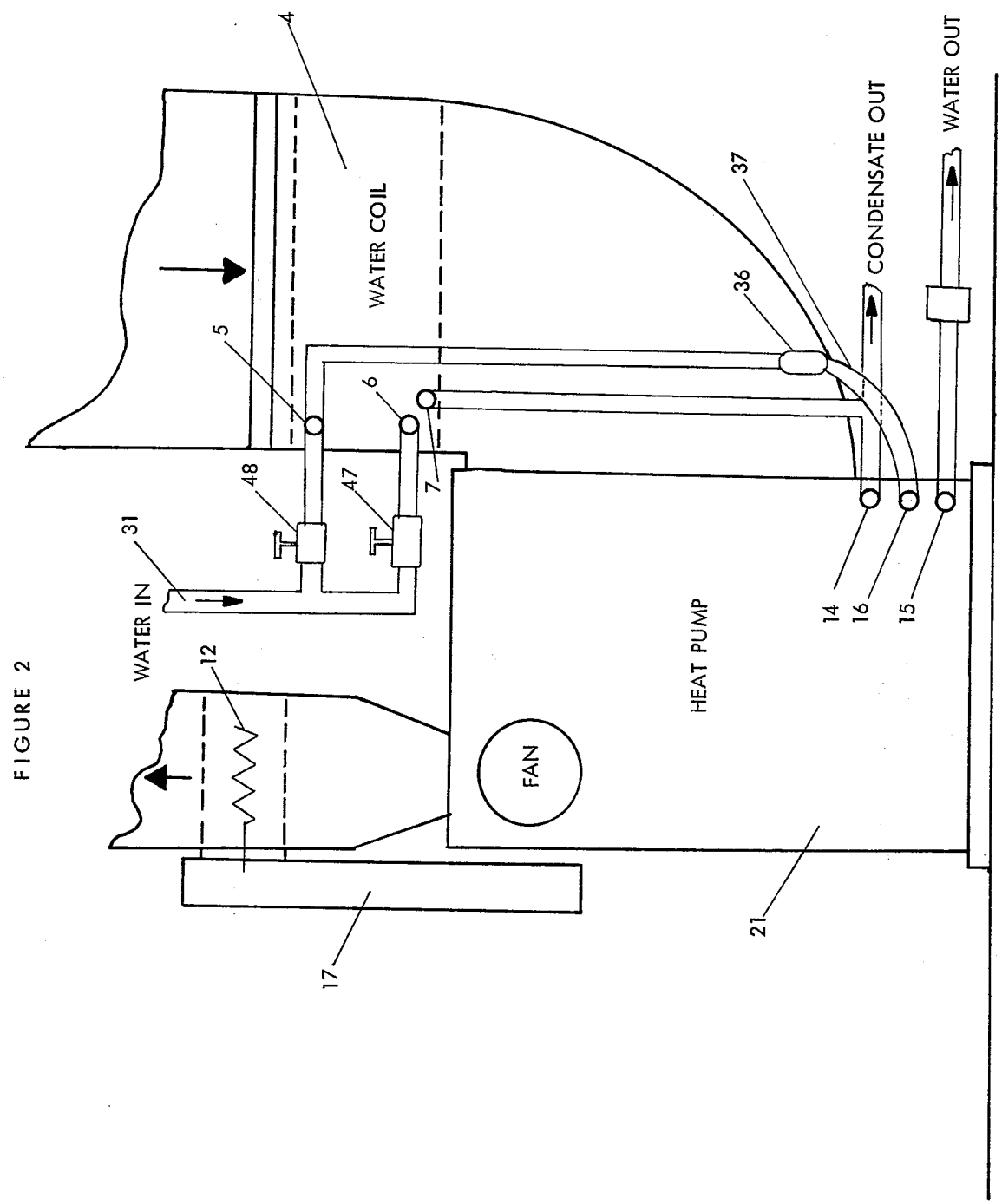
FIG. 2 is a schematic illustration of the plumbing and water flow to the heat pump and water coil shown in FIG. 1.

Thermostats 41 and 42 connect via electrical cables 56 to the control unit 37 which in turn connects to the heat pump 21, the electric heater 17, and the water values 47 and 48 (shown in FIG. 2).

Referring now to FIG. 2, the water flow through the system will be described. The ground water from a well, spring or lake enters the system through the pipe 31 shown. The water pipe can be iron, copper or plastic having a size chosen on the basis of the required mass flow rate and pressure drop. As shown, the incoming water is directed to two electrically operated solenoid valves 48 and 47. Valve 48 opens in response to a signal from the control unit to permit water to flow through heat pump 21 during winter operation. Only valve 47 opens during cooling operation, with the water flowing first through water coil 4 and then through heat pump 21. It is important that the water first passes through the water coil 4 via inlet 6 before entering heat pump 21 because the water coil must receive the coldest water to properly air condition and dehumidify. The fact that the water is warmed by about 10° F. after leaving outlet 5 before entering the heat pump does not significantly alter efficiency. Also, the heat pump is only used as a backup during the cooling season. This double pass scheme cuts the summer water usage significantly. Using pipe connection 6 as the water coil inlet provides the water with a flow direction counter to the air flow for maximum cooling and dehumidification. The water exits the coil at location 5.

For heating operation, with valve 48 open and valve 47 closed, the water bypasses water coil 4 and flows directly to heat pump 21. A flow control valve 36 (such as those described in U.S. Pat. Nos. 2,389,134 and 2,454,929) restricts or controls the mass flow of water in the summer and winter to a constant amount regardless of the incoming water pressure or the discharge pressure head. This feature is particularly important in systems which draw from wells that are also used for domestic purposes. The water pressure in domestic well systems cycles up and down with the pressure tank and well pump cycles. Without control valve 36, there would be wide variations in water flow which could result either in heat pump shutdown (due to low flow) or a waste of water (due to high pressure and excessive flow). The water enters the heat pump at inlet 16 via a flexible hose 37. This hose is located at a low point in the water flow line to allow fast disconnection and drainage. It also allows a flow meter to be inserted to check the mass flow rate in the system. The water finally exits the heat pump at outlet 15 and is ready for discharge to a stream, lake, drywell, lawn, garden, etc. Outlets 7 and 14 are condensate drains.

Figure 3:
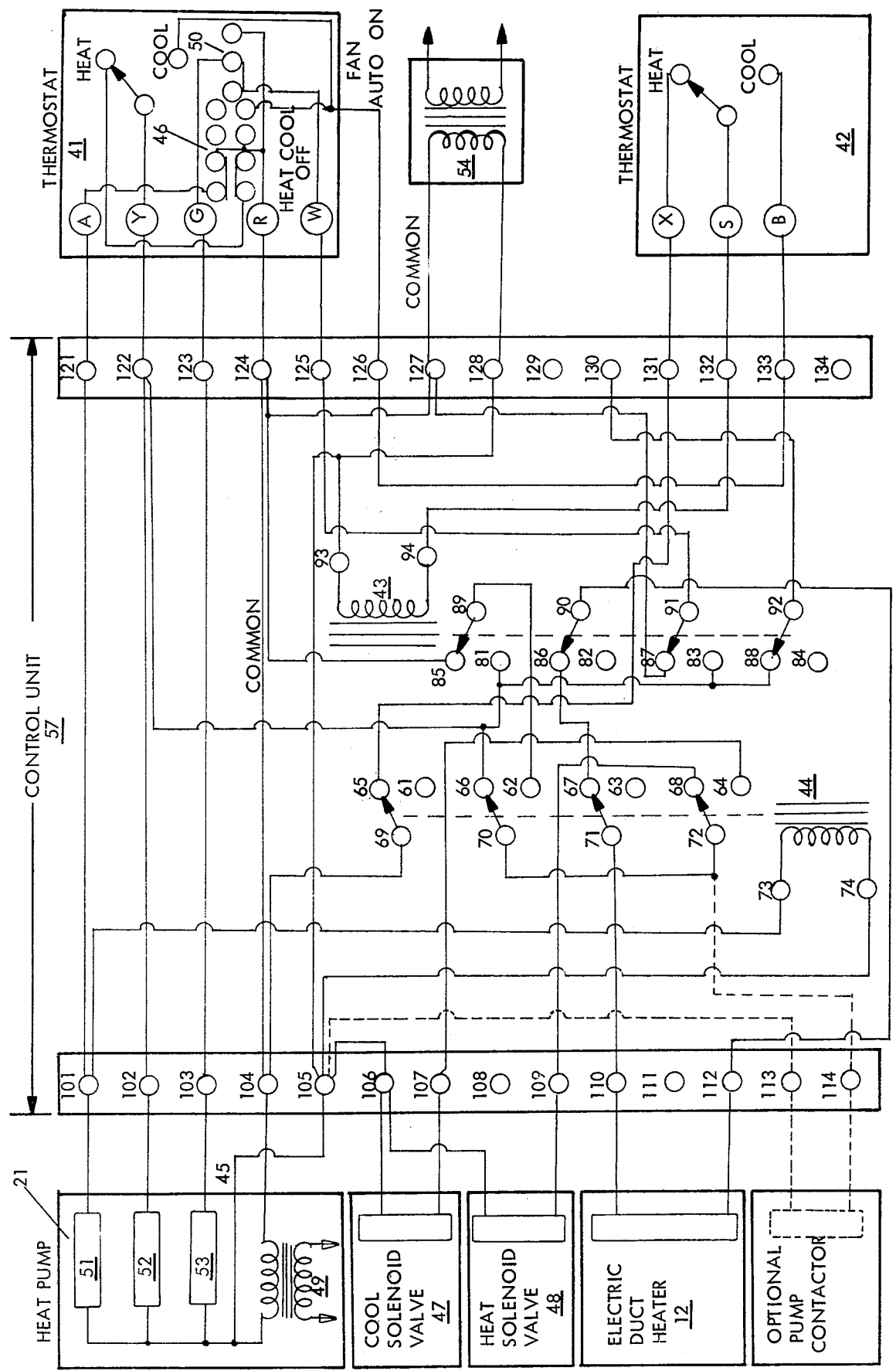
FIG. 3 is a simplified electrical schematic diagram showing electrical controls and functions of the ground water system.

To properly control the mechanical and water flow elements described above, the present invention utilizes a unique electronic control subsystem, as illustrated in FIG. 3. Two thermostats 41 and 42 are each independently set. By virtue of the fact that these two thermostats are independent of one another and that each controls two heating and two cooling systems, the user can trade off comfort versus cost. For example, in summer, the most economical cooling arrangement is for the water coil and fan, which are controlled by thermostat 42, to come on when the building temperature is 78° F. or higher; the user can then set thermostat 41 to turn the more expensive backup heat pump compressor on at 80° F. or 82° F. On the other hand, in winter the heat pump is more economical and can be set, for example, at 68° F. by thermostat 41, with the more expensive resistance/electric heat controlled by thermostat 42 set to come on at 62° F.

The heat pump thermostat 41 has a switch for heat-off-cool control 46 plus fan 50 auto and on. The thermostats are connected to a control panel 51 which comprises two four pole double throw relays 43, 44 and two terminal strips 101 to 114 and 121 to 134. The control panel is in turn connected by wires to the water source heat pump 21, two water controlling solenoid valves 47, 48 and the electric duct heater 12. Internal to the heat pump 21 are a control power transformer 49, a reversing valve 51, a compressor contactor 52 and a fan contactor 53. FIG. 4 shows all combinations of thermostat settings and corresponding functions selected by the control unit. Undesirable combinations, such as simultaneous heating and cooling, have been eliminated. These functions are described in the following paragraphs with reference to FIG. 3.

The 24 VAC power to operate all of the relays and contactors in the system comes from transformer 49 in a commercially available water source heat pump 21. The power must be extended outside the heat pump to the control panel by the addition of a "ground" wire 45 to terminal 105. If needed, an optional power transformer 54 can be added and connected to terminal strip post 127 and 128. Ground wire 45 is connected to one side of all relays and contactors in the controls. These devices operate by connecting power, via terminal 104, to the other side of these devices.

Heating Mode

When double pole double throw switch 46 on thermostat 41 is thrown into the heat position, both relay 44 and heat pump reversing valve 51 are energized via terminals 104 and 124, contacts R and A at thermostat 41, and terminals 101 and 121. The thermostat switch 46 in the heat position applies voltage to the "heat" contact in thermostat 41. When the temperature falls below the thermostat temperature, setting this "heat" contact applies current to contact Y which turns on compressor 52 via terminals 102 and 122. A fan 53 is turned on because relay 43 is de-energized so that its contact 83 is connected from terminal 122 to contact 91 of relay 43. This contact completes the circuit to terminal 125 and thence through the Auto-Fan switch 50 via W & G of thermostat 41 to terminals 103 and 123. Water is applied to heat pump 21 because the heat solenoid valve 48 is also connected to terminal 122 via contacts 66, 70, 72 and 68 of relay 44 and terminal 109. As stated above, relay 44 is in the on state during the heating mode.

Should electric backup heat be required, terminals S and X of thermostat 42 are interconnected. Relay 43 is energized due to current flow from terminal 104, to contacts 69 and 65 of relay 44, to terminal 131, then to contacts X and S of thermostat 42, terminal 132 and contacts 94 and 93 of relay coil 43. The electric heater has its own control transformer and contactor which are connected in series to terminals 110 and 112. The circuit connections to the electric heater are made via contacts 71 and 67 of relay 44, contacts 86 and 90 of relay 43, and terminal 112.

Cooling Mode

Thermostat 42 controls the water coil as the primary cooling system, with the heat pump controlled by thermostat 42 as a backup. Double pole-double throw switch 46 at thermostat 42 should be thrown to the cool position. No current from the common wire at terminals 104 and 124 flows to terminals 101 and 121; therefore, the reversing valves in the heat pump and relay 44 are in the off or cool position. Thermostat 42 turns on first to operate the fan 53 and circulate water through the water coil 4. In this case contacts S and B of thermostat 42 are interconnected, thereby connecting the common terminal 124 to contact R through switch 46 to the "cool" terminal at thermostat 41, to terminals 126 and 133 and contacts B and S of thermostat 42 to relay 43, thereby energizing relay 43. Connecting the cooling solenoid valve circuit via terminal 107 to contacts 64, 72, 70 and 62 of relay 44, contacts 89 and 85 of relay 43, terminal to 124 and common starts water flowing through the water coil and heat pump. The fan is energized from a connection via terminal 127 to contacts 87, 91 of relay 43, terminal 125 to terminal W on thermostat 41 through the fan switch 50 in the "auto" position to terminal 123. If backup or supplemental cooling is required, the heat pump compressor contactor 52 is switched on and returned to common when switch 46 at thermostat 41 is in the "cool" position. Since relay 44 is de-energized and an open circuit exists between its contacts 71 and 67, the electric heat cannot be turned on in the cooling mode.

While I have described and illustrated a specific embodiment of my invention, it will be clear that variations in the details of construction which are specifically illustrated and described may be resorted to without departing from the true scope and spirit of the invention defined in the appended claims.

What is claimed is:

1. A forced air heating and cooling system consisting essentially of:
   (a) primary heating means comprising a ground water source heat pump operating in a heating mode;
   (b) secondary heating means comprising a resistance heater;
   (c) primary cooling means comprising a ground water-to-air heat exchanger operating in a cooling mode;
   (d) secondary cooling means comprising said ground water source heat pump operating in a cooling mode;
   (e) thermostat control means for controlling said primary and secondary heating means, said control means being;
      (i) responsive to sensed temperature below a first predetermined temperature for energizing said heat pump in said heating mode while inhibiting said secondary heating means and said primary cooling means;
      (ii) responsive to sensed temperatures below a second predetermined temperature which is below said first predetermined temperature for energizing said primary and secondary heating means while inhibiting said primary cooling means;
      (iii) responsive to sensed temperatures above a third predetermined temperature which is at least as high as said first predetermined temperature for operating said primary cooling mean while inhibting said primary and secondary heating means; and
      (iv) responsive to sensed temperatures above a fourth predetermined temperature which is above said third predetermined temperature for operating said primary cooling means and said secondary cooling means while inhibiting said secondary heating means;
   (f) first and second water control valves controlled by said thermostat control means;
   (g) means for delivering ground water to said water control valves;
   (h) first conduit means for conducting water from said first valve, when open, through said water-to-air heat exchanger and then to said heat pump;
   (i) second conduit means for conducting water from said second valve, when open, through said heat pump without passing through said water-to-air heat exchanger; and
   (j) flow return means for returning water passing through said heat pump back to said ground water supply.

2. A system according to claim 1, further comprising an air flow path including the following elements disposed in the direction of air flow in the order named;
   air filter means;
   said ground water-to-air heat exchanger;
   said heat pump; and
   said secondary heating means.

3. A system according to claim 2, further comprising:
   a first air distribution baffle means disposed in said air flow path between said water-to-air heat exchanger and said heat pump; and
   a second air distribution baffle means disposed in said air flow path between said heat pump and said secondary heating means.

4. A system according to claim 1, wherein said secondary heating means is an electrical resistance heater of the type which heats air flowing past the heater.

5. A system according to claim 1 or 2, wherein the water flow path includes a supply of ground water having a temperature of about 40°–60° F.

6. A system according to claim 5, wherein said control means comprises:
   a first thermostat for controlling said heat pump, said first thermostat including means responsive to sensed temperatures below said first predetermined temperature for energizing said heat pump in said heating mode; means responsive to sensed temperatures above said fourth predetermined temperature for energizing said heat pump in said cooling mode; and means responsive to sensed temperatures between said first and fourth predetermined temperatures for inhibiting operation of said heat pump; and a second thermostat for controlling said primary cooling means and said secondary heating means, including means responsive to sensed temperatures above said third predetermined temperature for operating said primary cooling means; means responsive to sensed temperatures below said third predetermined temperature for inhibiting operation of said primary cooling means; means responsive to sensed temperatures below said second predetermined temperature for operating said secondary heating means; and means responsive to sensed temperatures above said second predetermined temperature for inhibiting operation of said secondary heating means.

* * * * *